United States Patent [19]

Masom

[11] Patent Number: 5,029,401
[45] Date of Patent: Jul. 9, 1991

[54] SEALS AND APPARATUS INCLUDING SEALS

[75] Inventor: Ronald A. Masom, Southampton, England

[73] Assignee: Smiths Industries Public Limited Company, London, United Kingdom

[21] Appl. No.: 454,823

[22] Filed: Dec. 22, 1989

[30] Foreign Application Priority Data

Feb. 8, 1989 [GB] United Kingdom ............... 8902763

[51] Int. Cl.⁵ .................. F16J 15/50; F16F 5/00; G01B 11/00
[52] U.S. Cl. ........................... 33/705; 33/707; 74/18.2; 267/64.27; 267/122; 277/3; 277/200; 277/212 B; 403/50
[58] Field of Search .............. 33/703, 705, 706, 707, 33/708; 74/18, 18.2; 267/64.13, 64.14, 64.19, 64.23, 64.27, 122; 277/3, 200, 212 FB; 403/50

[56] References Cited

U.S. PATENT DOCUMENTS

| | | | |
|---|---|---|---|
| 2,102,797 | 12/1937 | Helmer | 403/50 X |
| 2,912,867 | 11/1959 | Gallant | 74/18.2 |
| 2,942,838 | 6/1960 | Peters | 74/18.2 X |
| 3,106,099 | 10/1963 | Jeffrey et al. | 277/3 X |
| 3,290,945 | 12/1966 | Li et al. | 267/122 |
| 3,503,304 | 3/1970 | Comeau, Jr. et al. | 74/18.2 X |
| 4,532,766 | 8/1985 | White et al. | 277/3 X |
| 4,535,998 | 8/1985 | Katz | 277/212 FB |
| 4,556,369 | 12/1985 | Braun | 277/3 X |
| 4,603,482 | 8/1986 | Cusack | 33/705 |
| 4,620,418 | 11/1986 | Fujiwara et al. | 277/3 X |
| 4,777,361 | 10/1988 | Affa | 74/18.2 X |
| 4,818,111 | 4/1989 | Affa | 33/707 X |
| 4,819,919 | 4/1989 | Taylor | 277/212 FB |

Primary Examiner—William A. Cuchlinski, Jr.
Assistant Examiner—Scott Cummings
Attorney, Agent, or Firm—Pollock, Vande Sande and Priddy

[57] ABSTRACT

A seal for a linear displacement optical transducer has a tubular flexible bellows which is joined at one end to a movable carriage supporting an optically encoded track and which is movable along a cylinder supporting an optical read head. The bellows extends within the cylinder and has its other end sealed to an open end of the cylinder. A compensation chamber is sealed to the outside of the cylinder to enclose a major part of the length of the bellows and forms a sliding seal with a push-rod extending from a carriage. The bellows encloses a first volume of the dry inert gas within the cylinder to one side of the bellows and a second, similar volume of gas on the other side of the bellows and in the compensation chamber. Displacement of the carriage causes only a small change in pressure across the bellows which is accommodated by flexure. The compensation chamber isolates the bellows from atmospheric pressure change and ensures that temperature change affects both volume equally, minimizing pressure difference across the bellows.

5 Claims, 1 Drawing Sheet

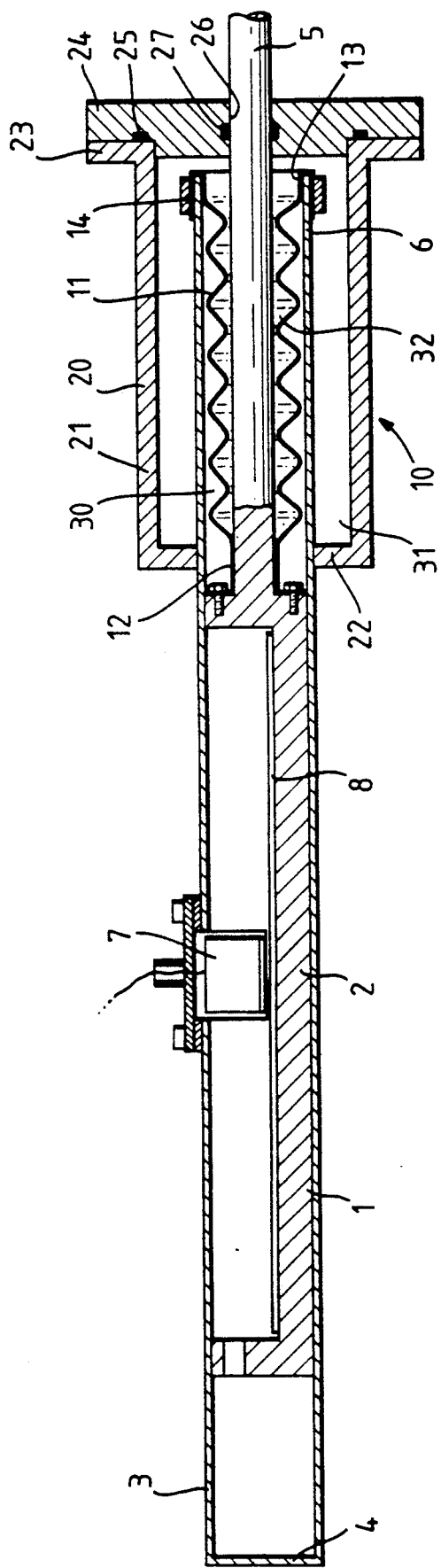

SEALS AND APPARATUS INCLUDING SEALS

BACKGROUND OF THE INVENTION

This invention relates to apparatus including seals.

In linear displacement transducers, especially those employing an optical sensor, it is important to prevent contamination entering the sensor. This can be done by means of a flexible seal which is secured at opposite ends to the two parts that are being displaced relative to one another. This can provide an hermetic seal but this leads to problems because there will be a change in pressure difference across the seal on movement of the two parts relative to one another. If there is any damage to the seal, contamination will be pumped into and out of the transducer by virtue of this pressure difference. This can also be a problem in other applications where it is desired to provide a flexible seal between linearly displaceable, members. Changes in temperature or external pressure can also lead to large pressure differences across the flexible seal which can lead to damage.

BRIEF SUMMARY OF THE INVENTION

It is an object of the present invention to provide a seal that can be used to alleviate the above-mentioned problem.

According to one aspect of the present invention there is provided a seal between a first member that is displaceable along its length and a second member within which the first member is displaceable, the second member being closed at one end and the seal comprising a flexible bellows member sealed with the other end of the said second member and with the first member such that the bellows member encloses a first volume of fluid within the second member on one side of the bellows member, and a compensating chamber sealed from the external atmosphere, the compensating chamber being sealed with the first and second members and enclosing a second volume of fluid on the opposite side of the bellows member, such that displacement of the first member along the second member causes only a small change in pressure across the bellows member which is accommodated by flexure of the bellows member.

The bellows member preferably extends entirely within the second member and externally along the first member. The compensating chamber preferably extends around the outside of a part of the second member along a major part at least of the bellows member and may be sealed with the first member by means of a sliding seal. The first and second volumes are preferably substantially the same. The fluid may be a dry, inert gas. One of the first and second members may carry an optically encoded rack, the other of the first and second members carrying an optical read head that reads the track.

According to another aspect of the present invention there is provided apparatus including a seal according to the above one aspect of the present invention.

According to a further aspect of the present invention there is provided a linear displacement transducer including carriage means that is displaceable along its length within a cylinder that is closed at one end, the carriage means supporting an encoded track and the cylinder supporting a read head arranged to read the said track and to provide an output in accordance with the position of the carriage, the transducer including a seal between the carriage and the cylinder to prevent contamination of the encoded track, the seal including a flexible tubular bellows sealed with other end of the cylinder and with the carriage such that the bellows encloses a first volume of gas within the cylinder on one side of the bellows, and a compensating chamber sealed from the external atmosphere, said compensating chamber being sealed with the cylinder and having a sliding seal with the carriage, and the compensating chamber enclosing a second volume of fluid on the opposite side of the bellows member, such that displacement of the carriage along the cylinder causes only small changes in pressure across the bellows which are accommodated by flexure of the bellows.

The displacement transducer may be an optical displacement transducer, the encoded track being optically encoded and the read head being an optical read head.

A linear optical displacement transducer, including a seal, in accordance with the present invention, will now be described, by way of example, with reference to the accompanying drawing.

BRIEF DESCRIPTION OF DRAWING

The drawing is a sectional elevation of the transducer.

DETAILED DESCRIPTION OF PREFERRED EMBODIMENT

The transducer comprises a first member 1 having a carriage 2 that is slidable along its length within a second member in the form of a cylinder 3 which is closed at its left end 4. A push rod 5 of circular section forms an extension from the right hand end of the carriage 2 and extends axially out of the open, right-hand end 6 of the cylinder 3. An optical read head 7 is mounted fixedly at a location along the length of the cylinder 3 to read an optically, encoded track 8 on the carriage 2 and provide an output in accordance with the position of the carriage. The first part 1 is sealed with the second part 3 by means of a seal indicated generally by the numeral 10.

The seal 10 includes a flexible bellows 11 of tubular shape with circumferential corrugations and made of, for example, rubber or another flexible material. At its left hand end 12, the bellows 11 is sealed to the carriage 2 and extends, within the cylinder 3 along the left-hand end of the push rod 5 which it embraces as a loose fit. The right hand end 13 of the bellows is everted about the open, right-hand end 6 of the cylinder to which it is sealed by means of a clamping ring 14.

The seal 10 also includes a compensating chamber 20 which comprises a sleeve 21 with an inturned flange 22 at one end which seals to the outside of the cylinder 3, such as by being welded to the cylinder. At its other end, the sleeve 21 has a outwardly directed flange 23 which abuts a disc 24 and is sealed to it by an O-ring 25. The disc 24 has a central aperture 26 through which extends the push-rod 5, the disc including a second O-ring seal 27 in the aperture which makes a sliding seal with the outside surface of the push rod 5.

The cylinder 3 is filled with a dry, inert gas at atmospheric pressure, this gas filling the space 30 to one side of the bellows 11, that is, between the external surface of the bellows and the interior of the cylinder. The compensating chamber 20 encloses a volume of the same dry inert gas at the same pressure which includes the volume occupying an annular region 31 between the sleeve 21 and the cylinder 3, and a region 32 on the inside of the bellows 11, between the bellows and the surface of the push rod 5. The size of the compensating chamber 20 is chosen so that the volume of gas in the compensating chamber is substantially equal to the volume of gas on the other side of the bellows 11, inside the cylinder 3.

In use, change in the input variable being measured causes a displacement of the push rod 5 along its length thereby causing a corresponding displacement of the carriage 2 and its optical track 8 relative to the read head 7. When the carriage 2 is moved along the cylinder 3, it will result in only a small change in the volume of gas in the cylinder externally of the bellows and a small change in the volume of gas internally of the bellows. Any pressure change caused by a difference between these two volumes is readily compensated by flexure of the bellows 11 until pressure on opposite sides of the bellows is equalized. In this way, movement of the push-rod 5 does not give rise to any pressure differential across the bellows thereby reducing the risk of leakage across the bellows.

Furthermore, because of the equal gas volumes on opposite sides of the bellows, any change in temperature will cause an equal pressure change on opposite sides of the bellows.

In addition, the bellows 11 will also be isolated by the compensating chamber 20 from any effects of changes in atmospheric pressure. Thus, large changes of both temperature and external pressure can take place without risk of damage to the bellows and without risk of contamination entering the cylinder and contaminating the optical system.

The invention is not confined to seals in transducers but could be used to seal other members that are linearly displaceable.

What I claim is:

1. Apparatus comprising: a first member; a second member, said second member having a closed end and an open end, said first member being displaceable along said second member; and a seal between said first and second members, said seal comprising: a flexible tubular bellows member; means sealing said bellows member with the open end of said second member; means sealing said bellows member with the first member, such that the first member extends within the bellows member and such that the bellows member extends entirely within the second member and encloses a first volume of fluid within the second member externally of the bellows member; a compensating chamber; a sliding seal between the compensating chamber and said first member; and means sealing said compensating chamber with said second member such that the compensating chamber extends around the outside of the second member along a major part of the bellows member and encloses a second volume of fluid a part of which is external of the second member and the remainder of which is internal of the bellows member, and such that displacement of the first member along the second member causes only a small change in pressure across the bellows member which is accommodated by flexure of the bellows member.

2. Apparatus according to claim 1, wherein the fluid is a dry, inert gas.

3. Apparatus according to claim 1, wherein one of the first and second members carries an optically encoded track, wherein the other of the first and second members carries an optical read head, and wherein the optical head is arranged to read said track.

4. A linear displacement transducer comprising: carriage means, said carriage means having an encoded track along its length; a cylinder, said cylinder having a closed end, an open end, and a read head, said read head being arranged to read the said track and to provide an output in accordance with the position of the carriage; a seal between the carriage and the cylinder to prevent contamination of the encoded track, said seal comprising: a flexible tubular bellows; means sealing the bellows with the open end of the cylinder; means sealing the bellows with the carriage such that a part of the carriage extends within the bellows and such that the bellows extends entirely within the cylinder and such that the bellows encloses a first volume of gas within the cylinder externally of the bellows; a compensating chamber; means sealing said compensating chamber with the cylinder; and a sliding seal between the compensating chamber and the carriage, the compensating chamber enclosing a second volume of fluid a part of which is internal of the bellows member, such that displacement of the carriage along the cylinder causes only small changes in pressure across the bellows which are accommodated by flexure of the bellows.

5. A transducer according to claim 4, wherein the encoded track is optically encoded, and wherein the read head is an optical read head.

* * * * *